United States Patent
Egami et al.

(10) Patent No.: US 7,586,278 B2
(45) Date of Patent: Sep. 8, 2009

(54) CONTROL APPARATUS FOR ELECTRIC VEHICLES

(75) Inventors: Tsuneyuki Egami, Gamagori (JP); Keiichi Kawakami, Anjo (JP)

(73) Assignee: DENSO Corporation, Kariya (JP)

( * ) Notice: Subject to any disclaimer, the term of this patent is extended or adjusted under 35 U.S.C. 154(b) by 378 days.

(21) Appl. No.: 11/606,061

(22) Filed: Nov. 30, 2006

(65) Prior Publication Data
US 2007/0126385 A1    Jun. 7, 2007

(30) Foreign Application Priority Data
Dec. 7, 2005  (JP)  ............................. 2005-353075

(51) Int. Cl.
*H02P 7/00* (2006.01)
(52) U.S. Cl. .................. 318/432; 318/139; 318/727
(58) Field of Classification Search ................. 318/811, 318/432, 434, 727, 800, 801, 805, 139
See application file for complete search history.

(56) References Cited

U.S. PATENT DOCUMENTS

| | | | |
|---|---|---|---|
| 5,245,294 A * | 9/1993 | Kumar ........................ | 324/677 |
| 7,099,756 B2 | 8/2006 | Sato | |
| 7,212,891 B2 | 5/2007 | Sato | |
| 7,235,937 B2 * | 6/2007 | Takai et al. ................. | 318/139 |
| 2002/0110007 A1 | 8/2002 | Kalman et al. | |
| 2004/0145338 A1 | 7/2004 | Nakamura et al. | |
| 2004/0145356 A1 | 7/2004 | Kalman et al. | |
| 2004/0189226 A1 | 9/2004 | King | |
| 2006/0052915 A1 | 3/2006 | Sato | |
| 2006/0247829 A1 | 11/2006 | Sato | |
| 2007/0119634 A1 | 5/2007 | Egami et al. | |
| 2007/0125582 A1 | 6/2007 | Egami et al. | |
| 2007/0126385 A1 | 6/2007 | Egami et al. | |
| 2007/0145926 A1 | 6/2007 | Egami et al. | |

(Continued)

FOREIGN PATENT DOCUMENTS

EP        1000796 A2     5/2000

(Continued)

OTHER PUBLICATIONS

U.S. Appl. No. 11/950,768, filed Dec. 5, 2007 (unpublished).

(Continued)

*Primary Examiner*—Rina I Duda
(74) *Attorney, Agent, or Firm*—Nixon & Vanderhye P.C.

(57) ABSTRACT

In a control apparatus for an electric vehicle, an input power operation quantity that reduces the difference between a target value of a system voltage and a detected value of the voltage is computed, and a duty ratio of a rectangular waveform applied to an inverter is set at a value that changes the input power of a MG unit by the input power operation quantity. The phase of the rectangular waveform is set at a value that suppresses torque variations caused by the duty ratio as variations of a torque generated by the AC motor. 3-phase voltage command signals are computed on the basis of the phase and the duty ratio and supplied to the inverter. In this way, variations in system voltage can be suppressed by controlling the input power of the AC motor, while sustaining the torque generated by the AC motor unchanged.

13 Claims, 4 Drawing Sheets

U.S. PATENT DOCUMENTS

2007/0145927 A1 6/2007 Egami et al.
2007/0194763 A1 8/2007 Egami et al.

FOREIGN PATENT DOCUMENTS

| EP | 1 460 756 A1 | 9/2004 |
| EP | 1603224 A | 12/2005 |
| EP | 1 800 934 A2 | 6/2007 |
| EP | 1 800 936 A2 | 6/2007 |
| JP | 2003-259689 | 9/2003 |

OTHER PUBLICATIONS

U.S. Appl. No. 12/068,595, filed Feb. 8, 2008 (unpublished).
U.S. Appl. No. 11/606,060, filed Nov. 30, 2006.
U.S. Appl. No. 11/605,456, filed Nov. 29, 2006.
U.S. Appl. No. 11/640,407, filed Dec. 18, 2006.
U.S. Appl. No. 11/643,980, filed Dec. 22, 2006.
U.S. Appl. No. 11/653,848, filed Jan. 17, 2007.
U.S. Appl. No. 11/707,903, filed Feb. 20, 2007.

* cited by examiner

CONTROL APPARATUS FOR ELECTRIC VEHICLES

CROSS REFERENCE TO RELATED APPLICATION

This application is based on and incorporates herein by reference Japanese Patent Application No. 2005-353075 filed on Dec. 7, 2005.

This application is related to five U.S. patent applications (Ser. Nos. 11/605,456, 11/606,060, 11/643,980, 11/640,407 and 11/653,848) claiming priorities to the following Japanese Patent Applications, respectively:
No. 2005-343750 filed on Nov. 29, 2005;
No. 2005-353076 filed on Dec. 7, 2005;
No. 2005-372966 filed on Dec. 26, 2005;
No. 2005-371264 filed on Dec. 26, 2005; and
No. 2006-40272 filed on Feb. 17, 2006.

FIELD OF THE INVENTION

The present invention relates to a control apparatus for an electric vehicle including a system mounted therein as a system for converting a voltage generated by a DC power supply into a system voltage by using a voltage converter and for driving an AC motor by applying the system voltage to the AC motor through an inverter.

BACKGROUND OF THE INVENTION

As disclosed in documents such as U.S. 2006/0052915A1 (JP 2004-274945A), in an electric vehicle having AC motors mounted therein to serve as a power source of the vehicle, the AC motors are each capable of serving as a motor for driving wheels of the vehicle as well as a motor driven by the engine to generate power. As the above system, a control apparatus for the electric vehicle includes a voltage-boosting converter for raising a voltage generated by a DC power supply, which is implemented by a secondary battery, to a high DC voltage appearing on a power supply line connected to AC motors through inverters. The inverters are capable of serving as a component for converting the raised DC voltage appearing on the power supply line into an AC voltage for driving one of the AC motors as well as a component for converting the AC voltage into a DC voltage supplied back or restored to the secondary battery through the voltage-boosting converter, which lowers the level of the DC voltage.

In the above system, in order to stabilize the voltage appearing on the power supply line, the voltage-boosting converter controls the voltage appearing on the power supply line to a target voltage. Further, at the same time, a smoothing capacitor connected to the power supply line smoothes the voltage appearing on the power supply line.

When a relation between electric power driving one of the AC motors and electric power generated by the other AC motor considerably varies due to a change in vehicle operating state or another reason, however, voltage variations caused by a change in such relation as voltage variations of the power supply line cannot be absorbed by the voltage-boosting converter and/or the smoothing capacitor. Thus, the voltage appearing on the power supply line becomes excessively high. As a result, it is likely that electronic equipment connected to the power supply line is damaged. In order to cope with this problem, there is provided a method for enhancing the effect of stabilizing the voltage appearing on the power supply line by using an improved voltage-boosting converter with better performance and a smoothing capacitor with a larger capacitance. By adoption of this method, however, the voltage-boosting converter with better performance and the smoothing capacitor with a larger capacitance will inevitably raise the cost of the control apparatus for an electric vehicle. Thus, demands for a system having a small size and a low cost cannot be met. The above relation between the power driving one of the AC motors and the power generated by the other AC motor is also referred to as a balance of power between the power driving one of the AC motors and the power generated by the other AC motor.

It is proposed for controlling the inverter to make a sum of energies (or the balance of electric power) of the two AC motors equal to 0 at the time the connection between the DC power supply and the voltage-boosting converter is cut off by using a relay in the event of a failure occurring in the DC power supply. However, this method is provided as a countermeasure to a failure occurring in the DC power supply and is capable of enhancing the effect of stabilizing the voltage appearing on the power supply line in a normal state of the power supply. In addition, even if an attempt is made to control the inverter to make a sum of energies (or the balance of power) of the two AC motors equal to 0 in a normal state, it is extremely difficult to control the inverter to make the sum of energies (or the balance of power) of the two AC motors equal to 0 in the following cases.

In the first place, one of the AC motors is linked to a driving shaft of the electric vehicle and the other AC motor is linked to an output shaft of the internal combustion engine, that is, the two AC motors are linked to members having different operations. In the second place, the effect of a processing delay of the control executed on the inverter becomes larger, for example, during a transient in which the operating state of the electric vehicle changes. The AC motor linked to the internal combustion engine is not capable of obviating power variations caused by changes of a torque generated by the internal combustion engine. This fact makes it even more difficult to control the inverter to make the sum of energies of the two AC motors equal to 0.

SUMMARY OF THE INVENTION

It is thus an object of the present invention to improve a control apparatus for electric vehicles to be capable of stabilizing a voltage appearing on a power supply line in small size and low cost.

According to one aspect of the present invention, a control apparatus an electric vehicle comprises a power conversion unit, a Motor/Generator (hereinafter "MG") unit, a motor control unit and a system voltage control unit. The power conversion unit converts a voltage generated by a DC power supply into a system voltage appearing on a power supply line. The MG unit, as a motor driving unit, includes an inverter connected to the power supply line and an AC motor driven by the inverter. The motor control unit controls the AC motor by a rectangular waveform control method of changing electrical conduction of the AC motor every predetermined value of an electrical angle of the AC motor. The system voltage control unit executes control of suppressing variations in the system voltage through adjustment of an input power of the MG unit by controlling a duty ratio (and/or a phase) of a rectangular waveform representing an electrical conduction state of the AC motor in accordance with the rectangular waveform control method.

Figure 5A:
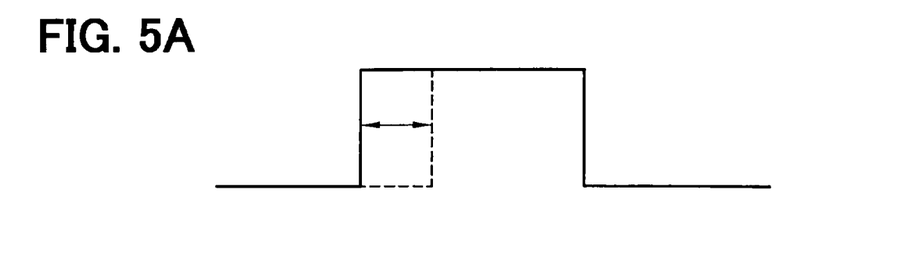
FIGS. 5A and 5B are diagrams showing a duty ratio operation and a phase operation attained in the embodiment.

In controlling the AC motor by the rectangular waveform control method, as shown in FIG. 5A, the duty ratio of the rectangular waveform of a current flowing to the AC motor is changed in order to vary the pulse width of the waveform.

Figure 5B:
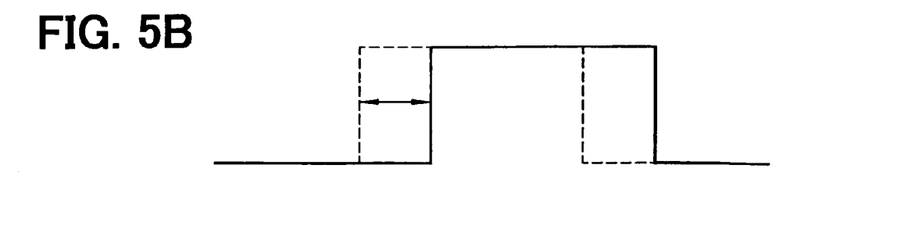

Alternatively, the phase of the rectangular waveform is also changed as shown in FIG. 5B. By changing the duty ratio or the phase, the input power of the MG unit can be varied. Thus, by adjusting the duty ratio and the phase, the input power of the MG unit can be controlled so as to suppress variations in the system voltage. As a result, when the balance of power between the AC motors varies considerably due to a change of the operating condition of the electric vehicle, the system voltage appearing on the power supply line can be stabilized effectively. In addition, without improving the performance of a power conversion unit and increasing the capacitance of a smoothing capacitor, the effect of the voltage stabilization of the power supply line can be improved and demands for a smaller size of the system as well as a lower cost can also be met as well.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
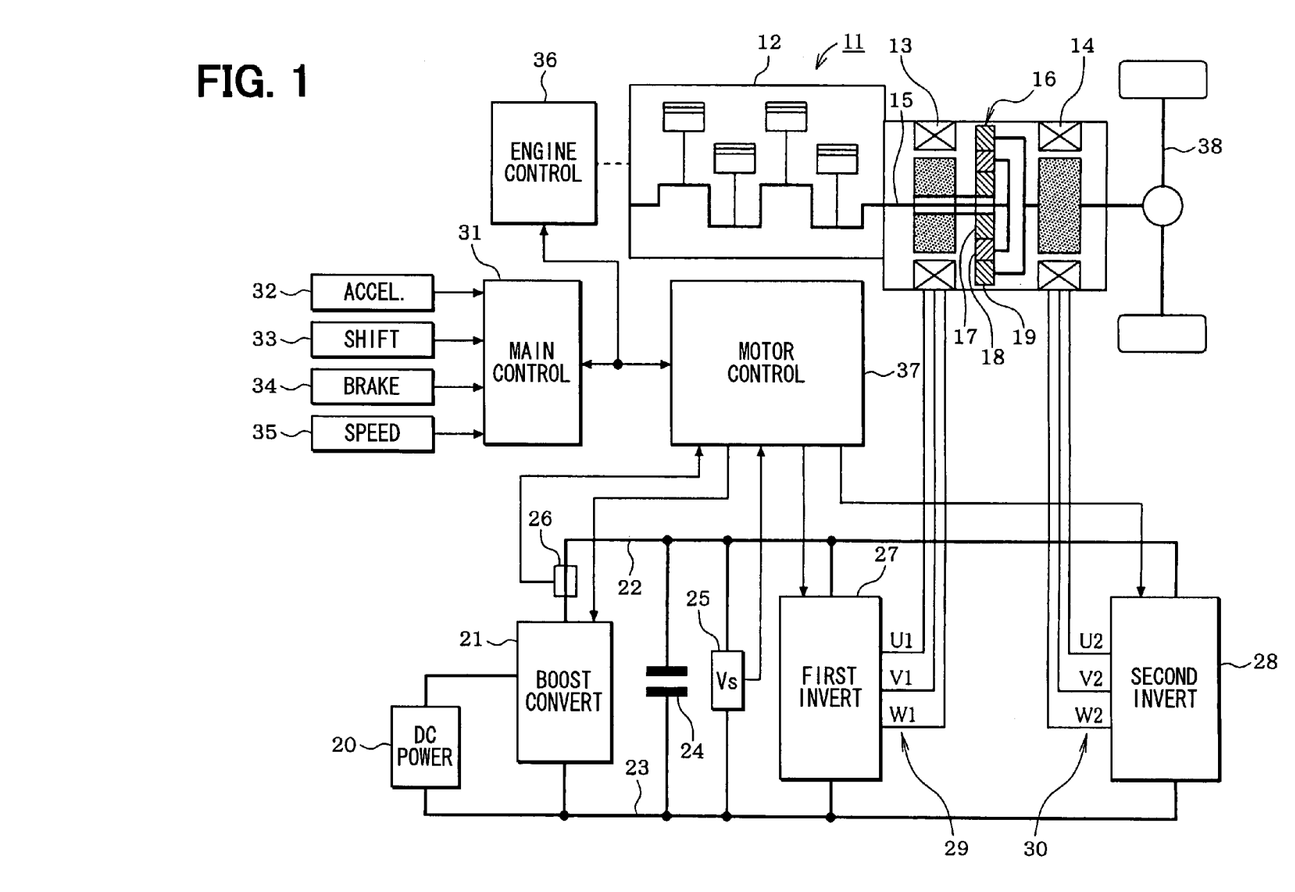
FIG. 1 is a block diagram showing a driving system for electric vehicles in accordance with an embodiment of the present invention.

Referring first to FIG. 1, an electric vehicle 11 has an internal combustion engine 12 in addition to a first AC motor 13 and a second AC motor 14. Thus, the electric vehicle 11 is an engine/motor hybrid vehicle. The engine 12 and the second AC motor 14 are employed as a drive power source for driving the electric vehicle 11. Power generated by a crankshaft 15 of the engine 12 is divided into two paths by a planetary gear set 16. The planetary gear set 16 includes a sun gear 17, a planetary gear 18 and a ring gear 19. The sun gear 17 rotates at the center. The planetary gear 18 rotates along a circumference external to the sun gear 17 while revolving around the center of its own. The ring gear 19 rotates along a circumference external to the planetary gear 18. The planetary gear 18 is linked to the crankshaft 15 of the engine 12 through a carrier not shown in the figure. On the other hand, the ring gear 19 is linked to a rotation shaft of the second AC motor 14. The sun gear 17 is linked to the AC motor 13.

A secondary battery serving as a DC power supply 20 is connected to a voltage-boosting converter 21 serving as a power conversion means. The voltage-boosting converter 21 is a component having a function for increasing a DC voltage output by the DC power supply 20 in order to generate a DC system voltage supplied between a power supply line 22 and a ground line 23 as well as a function for decreasing the system voltage in order to return or restore power to the DC power supply 20. A smoothing capacitor 24 for smoothing the system voltage and a voltage sensor 25 serving as a voltage detection means for detecting a value of the system voltage are connected between the power supply line 22 and the ground line 23. A current sensor 26 serving as a current detection means is placed on the power supply line 22 as a means for detecting a current flowing through the power supply line 22.

In addition, a three-phase first inverter 27 and a three-phase second inverter 28 are also connected between the power supply line 22 and the ground line 23. The three-phase first inverter 27 and the three-phase second inverter 28 are each a three-phase inverter of a voltage control type. The three-phase first inverter 27 drives the first AC motor 13, whereas the three-phase second inverter 28 drives the second AC motor 14. The three-phase first inverter 27 and the first AC motor 13 form a first motor driving unit 29, which is also referred to as a first MG unit 29. Similarly, the three-phase second inverter 28 and the second AC motor 14 form a second motor driving unit 30, which is also referred to as a second MG unit 30.

A main control unit 31 is a computer for executing overall control on the electric vehicle as a whole. The main control unit 31 acquires signals output by a variety of sensors and switches in order to detect an operating state of the electric vehicle. The sensors and the switches include an accelerator sensor 32, a shift switch 33, a brake switch 34 and a vehicle speed sensor 35. The accelerator sensor 32 is a sensor for detecting an acceleration operation quantity representing an operation quantity of an acceleration pedal. The shift switch 33 is a sensor for detecting the position of a shift operation of the electric vehicle. The position of the shift operation can be a parking position (P), a rear driving position (R), a neutral position (N) or a forward driving position (D). The brake switch 34 is a switch for detecting a braking operation. The vehicle speed sensor 35 is a sensor for detecting a value of the speed of the electric vehicle. The main control unit 31 exchanges control and data signals with an engine control unit 36 and a motor control unit 37, driving the engine control unit 36 and the motor control unit 37 in order to control the engine 12, the first AC motor 13 and the second AC motor 14 in accordance with the operating state of the electric vehicle. The engine control unit 36 is for controlling the operation of the engine 12, whereas the motor control unit 37 is for controlling the operations of the first AC motor 13 and the second AC motor 14.

Figure 2:
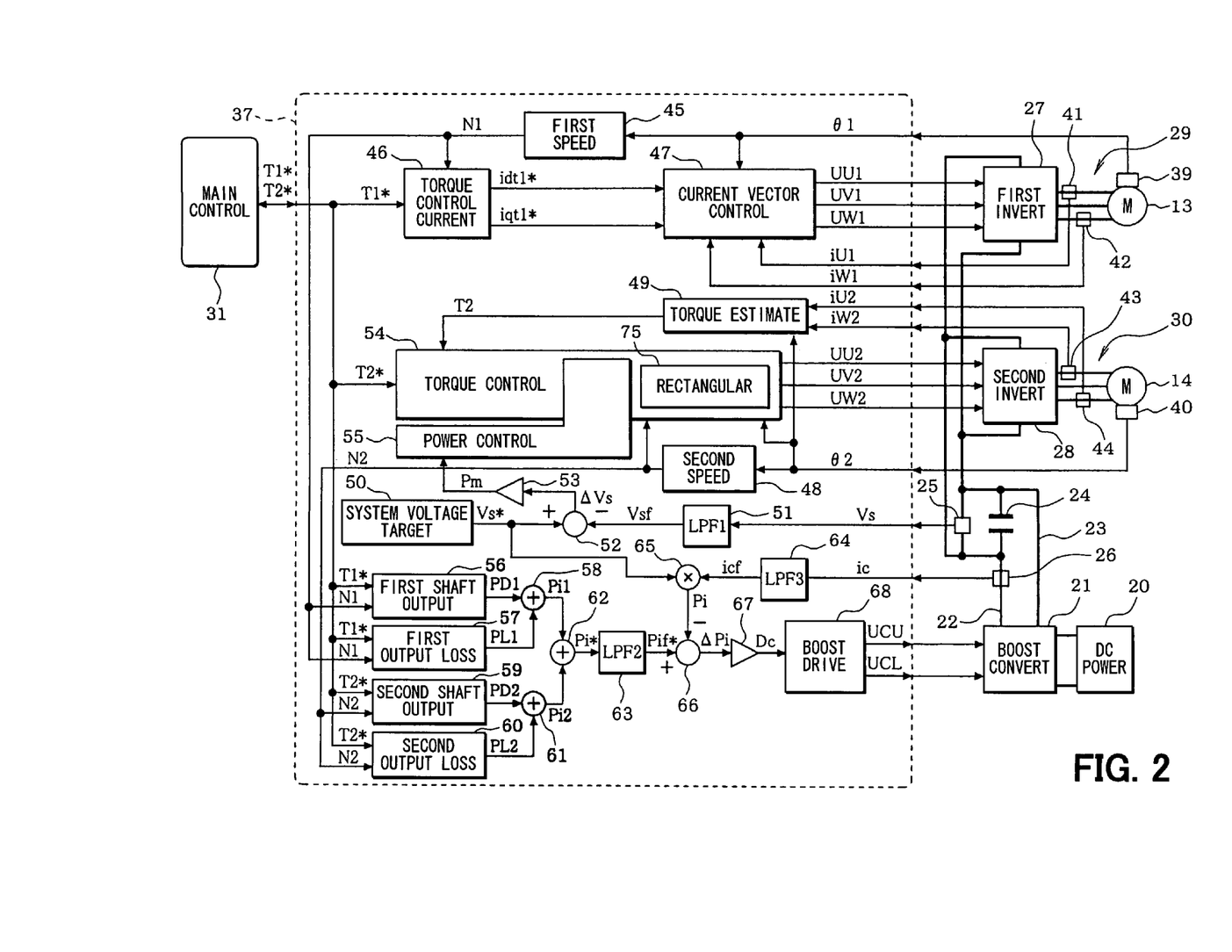
FIG. 2 is a block diagram showing an AC motor driving system in the embodiment.

Next, control of the first AC motor 13 and the second AC motor 14 is described by referring to FIG. 2. The first AC motor 13 and the second AC motor 14 are each a three-phase permanent-magnet synchronous motor having a built-in permanent magnet. The first AC motor 13 and the second AC motor 14 have respectively rotor rotational position sensors 39 and 40 each used for detecting the rotational position of the rotor of the motor. On the basis of three-phase voltage command signals UU1, UV1 and UW1 output by the motor control unit 37, the first inverter 27 of the voltage control type converts a DC voltage appearing on the power supply line 22 into three-phase AC voltages U1, V1 and W1 for driving the first AC motor 13. The DC voltage appearing on the power supply line 22 is a system voltage generated by the voltage-boosting converter 21. A U-phase current sensor 41 is a sensor for detecting a U-phase current iU1 of the first AC motor 13, whereas a W-phase current sensor 42 is a sensor for detecting a W-phase current iW1 of the first AC motor 13.

Similarly, on the basis of three-phase voltage command signals UU2, UV2 and UW2 output by the motor control unit 37, the three-phase second inverter 28 of the voltage control type converts the DC voltage appearing on the power supply line 22 into three-phase AC voltages U2, V2 and W2 for driving the second AC motor 14. A U-phase current sensor 43 is a sensor for detecting a U-phase current iU2 of the second AC motor 14, whereas a W-phase current sensor 44 is a sensor for detecting a W-phase current iW2 of the first AC motor 13.

It is to be noted that the first AC motor 13 and the second AC motor 14 each also function as a generator, when the first AC motor 13 and the second AC motor 14 are driven by the three-phase first inverter 27 and the three-phase second inverter 28 respectively to generate a negative torque. For example, when the electric vehicle 11 is being decelerated, AC power generated by the second AC motor 14 as deceleration energy is converted into DC power by the three-phase second inverter 28 and the DC power is accumulated back in the DC power supply 20. Normally, a portion of power of the engine 12 is transferred to the first AC motor 13 by way of the planetary gear 18, causing the first AC motor 13 to operate as a generator for generating electric power corresponding to the portion of the power of the engine 12. The electric power generated by the first AC motor 13 is supplied to the second AC motor 14, causing the second AC motor 14 to operate as a motor. The power of the engine 12 is divided into two paths by the planetary gear set 16. When a torque propagated to the ring gear 19 of the planetary gear set 16 is greater than a torque required by a running operation of the electric vehicle, the first AC motor 13 functions as a motor, drawing power for the engine 12. In this case, the second AC motor 14 functions as a generator generating power to be supplied to the first AC motor 13. Thus, each of the first AC motor 13 and the second AC motor 14 operates as a motor/generator (MG).

In execution of torque control on the first AC motor 13, the motor control unit 37 generates the three-phase voltage command signals UU1, UV1 and UW1 by a sinusoidal waveform PWM control method on the basis of a torque command value T1* output by the main control unit 31, the U-phase current iU1 and W-phase current iW1 of the first AC motor 13 as well as the rotor rotational position θ1 of the first AC motor 13 as described below. As described above, the U-phase current iU1 and the W-phase current iW1 are signals output by the current sensors 41 and 42 respectively, whereas the rotor rotational position θ1 is a signal output by a rotor rotational position sensor 39.

The signal output by the rotor rotational position sensor 39 as a signal representing the rotor rotational position θ1 of the first AC motor 13 is supplied to a first rotation speed computation unit 45 for computing a first rotation speed N1 of the first AC motor 13. Then, in order to apply current feedback control to each of a d-axis current id1 and a q-axis current iq1 independently of each other in a d-q coordinate pathset as a rotational coordinate system of the rotor of the first AC motor 13, a first torque control current computation unit 46 computes a torque control current vector it1* representing a d-axis torque control current idt1* and a q-axis torque control current iqt1* by using typically map data or an equation as a vector according to the torque command value T1* and rotation speed N1 of the first AC motor 13.

Subsequently, a current vector control unit 47 computes an actual current vector i1 representing the d-axis current id1 and the q-axis current iq1 on the basis of the U-phase current iU1 and W-phase current iW1 of the first AC motor 13 as well as the rotor rotational position θ1 of the first AC motor 13 as described below. As described above, the U-phase current iU1 and the W-phase current iW1 are signals output by the current sensors 41 and 42 respectively, whereas the rotor rotational position θ1 is a signal output by the rotor rotational position sensor 39. Then, the current vector control unit 47 computes a d-axis command voltage Vd1* by execution of P-I control for reducing a difference Δid1 between a d-axis torque control current idt1* and an actual d-axis current id1, and computes a q-axis command voltage Vq1* by execution of proportional-and-integral (P-I) control for reducing a difference Δiq1 between a q-axis torque control current iqt1* and an actual q-axis current iq1. Finally, the current vector control unit 47 converts the d-axis command voltage Vd1* and the q-axis command voltage Vq1* into the three-phase PWM command signals UU1, UV1 and UW1, outputting the three-phase PWM command signals UU1, UV1 and UW1 to the three-phase first inverter 27.

In applying torque control to the second AC motor 14, on the other hand, the motor control apparatus 37 generates 3-phase voltage command signals UU2, UV2 and UW2 by a rectangular waveform control method on the basis of a torque command value T2* output by the main control apparatus 31, a U-phase current iU2 and a W-phase current iW2 (that is, signals output by current sensors 44 and 43 respectively), which are generated by the second AC motor 14, a rotational position θ2 of the second AC motor 14 (or a signal output by a rotor rotational position sensor 40). The rectangular waveform control method is a method of controlling the second AC motor 14 by changing electrical conduction of the second AC motor 14 every predetermined value of the electrical angle of the second AC motor 14.

At that time, the input power of the second AC motor 14 is controlled by adjusting the duty ratio (Duty) of an electric waveform current flowing to the second AC motor 14 in order to change the pulse width of the current as shown in FIG. 5A or by adjusting the phase φ of the current as shown in FIG. 5B in order to suppress variations in system voltage as well as sustain the torque generated by the second AC motor 14 unchanged (torque command value T2*).

Specifically, first of all, the rotational position θ2 of the second AC motor 14 (or a signal output by the rotor rotational position sensor 40) is supplied to a second rotation speed computation unit 48 to compute a rotation speed N2 of the second AC motor 14. At the same time, the rotational position θ2 of the second AC motor 14 as well as the U-phase current iU2 and the W-phase current iW2 (that is, signals output by the current sensors 44 and 43 respectively), which are generated by the second AC motor 14, are supplied to a torque estimation unit 49 for estimating a torque T2 generated by a current flowing to the second motor 14.

Figure 3:
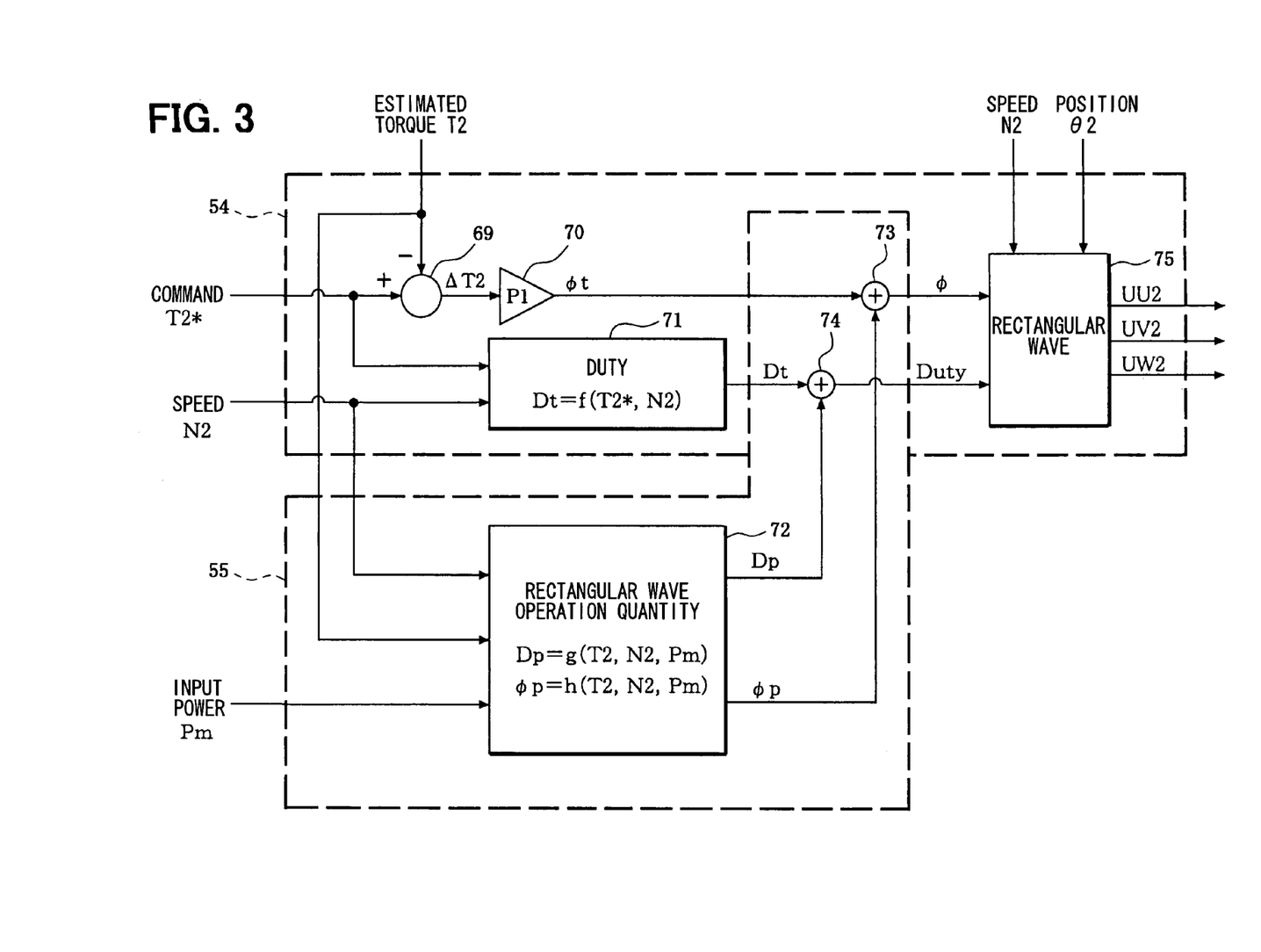
FIG. 3 is a block diagram showing a motor control unit in the embodiment.

Then, as shown in FIG. 3, in the torque control unit 54 (serving as a motor control means), a difference computation unit 69 computes a difference ΔT2 between the torque command value T2* and the estimated value T2 of the second AC motor 14, supplying the difference ΔT2 to a P-I controller 70. The P-I controller 70 executes proportional-and-integral (P-I) control to adjust a phase φt of the rectangular waveform so that the phase φt reduces the difference ΔT2 between the torque command value T2* and the estimated value T2. A duty computation unit 71 computes a duty ratio Dt of the rectangular waveform on the basis of the torque command value T2* of the second AC motor 14 and the rotation speed N2 of the second AC motor 14 by using typically map data or an equation.

In addition, as shown in FIG. 2, a system voltage target value computation unit 50 (serving as a target voltage computation means) computes a target value Vs* of the system voltage, whereas a voltage sensor 25 supplies a value detected by the voltage sensor 25 as a detected value Vs of the system voltage to a first low pass filter 51 (serving as a first low frequency component passing means) for carrying a low pass filtering process to pass only low frequency components of the detected value Vs of the system voltage. Then, a difference computation unit 52 computes a difference ΔVs between the target value Vs* of the system voltage and a detected value Vsf obtained as a result of the low pass filtering process, supplying the difference ΔVs to a P-I controller 53 (serving as a power operation quantity computation means) for executing P-I control to compute an input power operation quantity Pm of the second AC motor 14. The input power operation quantity Pm is a quantity that reduces the difference ΔVs between the target value Vs* of the system voltage and a detected value Vsf obtained as a result of the low pass filtering process.

Then, as shown in FIG. 3, the input power operation quantity Pm of the second MG unit 30, the estimated torque T2 for the second AC motor 14 and the rotation speed N2 of the second AC motor 14 are supplied to a rectangular waveform operation quantity computation unit 72 (serving as a rectangular waveform operation quantity computation means) in a power control unit 55 (serving as a system voltage control means) in order to compute a duty ratio operation quantity Dp and phase operation quantity φp of the rectangular waveform as follows.

Figure 4:
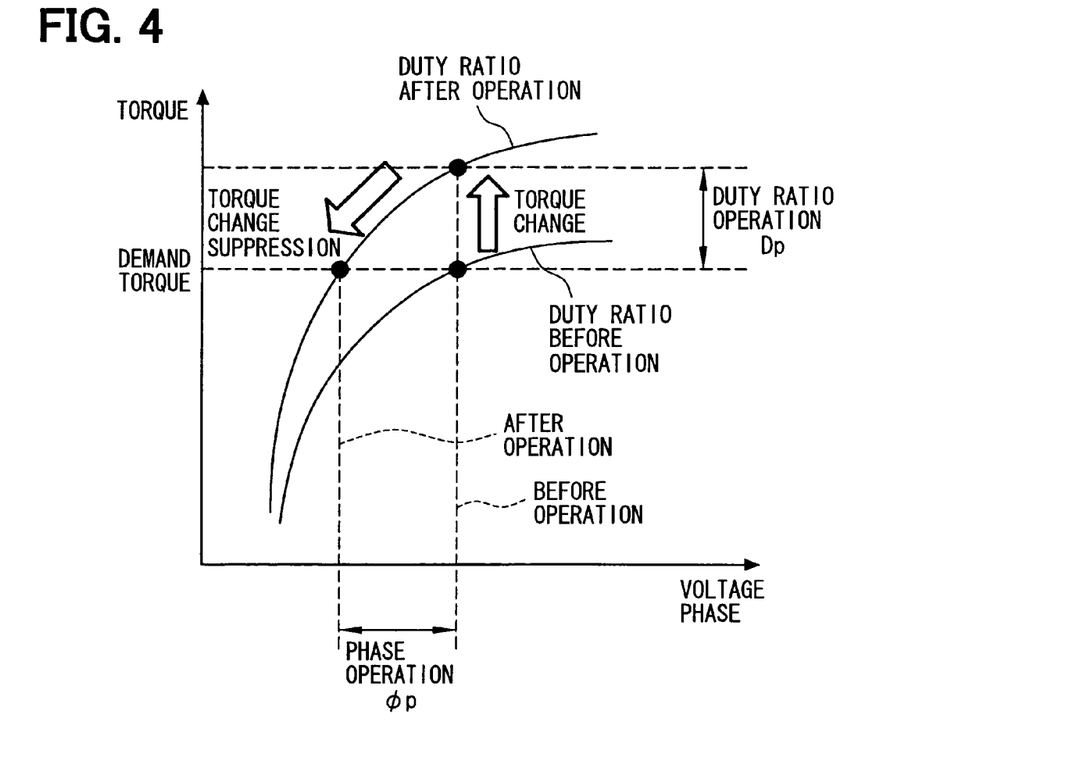
FIG. 4 is a graph showing a relation between a voltage phase and a torque used for computing a duty ratio operation quantity and a phase operation quantity.

First, the duty ratio operation quantity Dp of the rectangular waveform is computed on the basis of the input power operation quantity Pm, the estimated torque T2 and the rotation speed N2 by using typically map data or an equation. To be more specific, the rectangular waveform operation quantity computation unit 72 computes a duty ratio operation quantity Dp that changes the input power of the second MG unit 30 by the input power operation quantity Pm as shown in FIG. 4. Then, the phase operation quantity φp of the rectangular waveform is computed on the basis of the input power operation quantity Pm, the estimated torque T2 and the rotation speed N2 by using typically map data or an equation. To be more specific, the rectangular waveform operation quantity computation unit 72 computes a phase operation quantity φp for the duty ratio operation quantity Dp as a quantity that suppresses variations of a torque generated by the second AC motor 14 by a duty ratio operation based on the duty ratio operation quantity Dp as shown in FIG. 4.

The rectangular waveform operation quantity computation unit 72 includes a quantity limiting means (not shown). The quantity limiting means is a means for carrying out a guarding process to prevent each of the phase operation quantity φp and the duty ratio operation quantity Dp from exceeding a predetermined limit value. To be more specific, the limiting means prevents each of the phase operation quantity φp and the duty ratio operation quantity Dp from increasing to an excessively large value greater than the predetermined limit value.

It is to be noted that, in the processing to compute the phase operation quantity φp and the duty ratio operation quantity Dp, the torque command value T2* can be used as a substitute for the estimated torque T2. In addition, as will be described later, the rectangular waveform operation quantity computation unit 72 may also compute a phase operation quantity φp on the basis of a final duty ratio Duty(=Dt+Dp) and the torque command value T2* as a phase operation quantity φp suppressing torque variations generated by the second AC motor 14 by a duty ratio operation based on the duty ratio.

Then, an adder 73 in the power control unit 55 adds the phase operation quantity φp to the phase φt of the rectangular waveform to produce a final phase φ(=φt+φp) of the rectangular waveform. At the same time, an adder 74 also in the power control unit 55 adds the duty ratio operation quantity Dp to the duty ratio Dt of the rectangular waveform to produce a final duty ratio Duty(=Dt+Dp) of the rectangular waveform. Then, a rectangular waveform computation unit 75 in the torque control unit 54 computes 3-phase voltage command signals UU2, UV2 and UW2 (rectangular waveform command signals) on the basis of the final phase φ of the rectangular waveform, the final duty ratio Duty of the rectangular waveform, the rotor rotational position θ2 of the second AC motor 14 and the rotation speed N2 of the second AC motor 14, outputting the 3-phase voltage command signals UU2, UV2 and UW2 to a second inverter 28.

In this way, the input power of a second MG unit 30 (or the second AC motor 14) is adjusted to suppress variations in the system voltage by reducing the difference ΔVs between the target value Vs* of the system voltage and the detected value Vsf while sustaining the torque generated by the second AC motor 14 unchanged (that is, at the torque command value T2*).

In addition, in order to obviate mutual interferences between the system voltage stabilization control to stabilize the system voltage by adjusting the input power of the second MG unit 30 and the control executed by the voltage-boosting converter 21 to adjust the system voltage, the motor control unit 37 executes conversion power control of controlling a conduction duty ratio Dc of a switching device (not shown) as a device employed in the voltage-boosting converter 21 so as to reduce the difference ΔPi between a command value Pi* of a power, which is output by the voltage-boosting converter 21 as a power referred to hereafter as a conversion power, and a detected value Pi of the conversion power.

Specifically, in order to compute the command value Pi* of the conversion power, first of all, the torque command value T1* and rotation speed N1 of the first AC motor 13 are supplied to the first shaft output computation unit 56 to be used for computing a shaft output PD1 of the first AC motor 13. At the same time, the torque command value T1* and rotation speed N1 of the first AC motor 13 are supplied to a first output loss computation unit 57 to be used for computing a output loss PL1 of the first MG unit 29. Then, an adder 58 adds the shaft output PD1 of the first AC motor 13 to the output loss PL1 of the first MG unit 29 in order to compute an input power Pi1 of the first MG unit 29. At that time, if the first AC motor 13 is functioning as a generator, the computation result of the input power Pi1 of the first MG unit 29 is a negative value.

In the mean time, a torque command value T2* and rotation speed N2 of the second AC motor 14 are supplied to a second shaft output computation unit 59 to be used for computing a shaft output PD2 of the second AC motor 14. At the same time, the torque command value T2* and rotation speed N2 of the second AC motor 14 are supplied to a second output loss computation unit 60 to be used for computing a output loss PL2 of the second MG unit 30. Then, an adder 61 adds the shaft output PD2 of the second AC motor 14 to the output loss PL2 of the second MG unit 30 in order to compute an input power Pi2 of the second MG unit 30. At that time, if the second AC motor 14 is functioning as a generator, the computation result of the input power Pi2 of the second MG unit 30 is a negative value.

Then, an adder 62 adds an input power Pi1 of a first MG unit 29 to an input power Pi2 of the second MG unit 30 to compute a total power Pi* and supplies the total power Pi* to a second low pass filter 63 (serving as a second low frequency component passing means) for carrying a low pass filtering process to pass only low frequency components of the total power Pi*. A total power Pif* obtained as a result of the low pass filtering process is taken as a command value Pif* of a conversion power. Thus, the adder 62 and the second low pass filter 63 operate as a conversion power command value computation means.

In order to compute a detected value Pi of the conversion power, on the other hand, a signal output by the current sensor 26 as a signal representing a detected value ic of the output current of the voltage-boosting converter 21 is supplied to a third low pass filter 64 serving as a third low frequency component passing means for carrying out a low pass filtering process to pass only components included in the output current of the voltage-boosting converter 21 as components each having a low frequency. The third low pass filter 64 supplies a detected value icf of the output current of the voltage-boosting converter 21 as a result obtained from the low pass filtering process to a conversion power detection unit 65 serving as a conversion value computation means. The conversion power detection unit 65 multiplies the detected value icf by the target value Vs* of the system voltage in order to compute a detected value Pi of the conversion power. It is to be noted that the detected value Pi of the conversion power can also be computed by multiplying the detected value icf of the output current of the voltage-boosting converter 21 by the detected value Vsf of the system voltage.

Then, a subtractor 66 computes a difference ΔPi between a command value Pif* and detected value Pi of the conversion power. The subtractor 66 supplies the difference ΔPi to a P-I controller 67 serving as a conversion power control quantity computation means for computing a conduction duty ratio Dc of a switching device (not shown) by execution of P-I control to reduce the difference ΔPi between the command value Pif* and detected value Pi of the conversion power. The conduction duty ratio Dc is supplied to a voltage-boosting drive signal computation unit 68 serving as a conversion power control means. Subsequently, the voltage-boosting drive signal computation unit 68 computes voltage-boosting drive signals UCU and UCL on the basis of the conduction duty ratio Dc and supplies the voltage-boosting drive signals UCU and UCL to the voltage-boosting converter 21.

Thus, the power output by the voltage-boosting converter 21 is controlled in order to avoid mutual interferences between control executed by adjusting the input power of the second MG unit 30 (or the second AC motor 14) as control of the system voltage and control executed by using the voltage-boosting converter 21 as control of the system voltage so as to reduce the difference ΔPi between the command value Pif* and detected value Pi of the conversion power.

In the embodiment described above, the input power of the second MG unit 30 (or the second AC motor 14) can be changed by varying the duty ratio Duty and phase φ of a rectangular waveform of a current flowing to the second AC motor 14 during an electrical conduction state of the second AC motor 14 in a process to control the second AC motor 14 by the rectangular waveform control method. Therefore, the duty ratio Duty (and the phase φ) of the rectangular waveform of the current are adjusted so as to reduce the difference ΔVs between the target value Vs* and detected value Vsf of the system voltage by setting the input power of the second MG unit 30 (or the second AC motor 14) as an input power that suppresses variations of the system voltage (which is a voltage appearing on the power supply line 22). Thus, even if the balance of power between the two AC motors 13 and 14 substantially changes due to a change in vehicle operating state or another reason, the system voltage can be stabilized effectively. In addition, without improving the performance of the voltage-boosting converter 21 and increasing the capacitance of the smoothing capacitor 24, the effect of the voltage stabilization of the power supply line 22 can be improved and demands for a smaller size of the system as well as a lower cost can also be met as well.

In addition, in this embodiment, the duty ratio operation quantity Dp that changes the input power of the second MG unit 30 by the input power operation quantity Pm is computed and, then, the phase operation quantity φp that suppresses variations of the torque generated by the second AC motor 14 due to the duty ratio operation applying the duty ratio operation quantity Dp is computed. Thus, the system voltage can be controlled by adjusting the input power of the second MG unit 30 so as to sustain the torque generated by the second AC motor 14 unchanged (that is, at the torque command value T2*). As a result, variations in system voltage can be suppressed without providing a bad effect on the operating state of the vehicle.

Furthermore, in this embodiment, a guarding process is carried out in order to prevent each of the phase operation quantity φp and the duty ratio operation quantity Dp from exceeding a predetermined limit value. To be more specific, the quantity limiting means prevents each of the phase operation quantity φp and the duty ratio operation quantity Dp from increasing to an excessively large value greater than the predetermined limit value in order to prevent the second AC motor 14 from departing from a normal state.

Moreover, in this embodiment, the input power operation quantity Pm of the second MG unit 30 is computed by using the detected value Vsf obtained as a result of the low pass filtering process as the detected value of the system voltage. Thus, the input power operation quantity Pm can be computed by using the detected value Vsf obtained as a result of a low pass filtering process, which is carried out in order to eliminate noise components (or high frequency components) from the detected value Vs of the of the system voltage. That is, the input power operation quantity Pm can be computed by using the detected value Vsf without noises. As a result, the precision of the computation of the input power operation quantity Pm is improved.

Here, if control is executed to suppress variations in system voltage by adjusting the input power of the second MG unit 30 (or the second AC motor 14), it is quite possible that there are mutual interferences between control executed by adjusting the input power of the second MG unit 30 (or the second AC motor 14) as control of the system voltage and control executed by using the voltage-boosting converter 21 as control of the system voltage.

In order to cope with such mutual interferences, in this embodiment, the command value Pif* of the conversion power is computed from the total power Pi*, which is obtained by adding the input power Pi1 of the first AC motor 13 to the input power Pi2 of the second AC motor 14. In addition, the target value Vs* (or detected value Vsf) of the system voltage may be multiplied by the detected value icf of the output current of the voltage-boosting converter 21 to produce the detected value Pi of the conversion power. Then, the output power of the voltage-boosting converter 21 is controlled so as to reduce the difference ΔPi between the command value Pif* and detected value Pi of the conversion power. Thus, it is possible to avoid mutual interferences between control executed by adjusting the input power of the second MG unit 30 (or the second AC motor 14) as control of the system voltage and control executed by using the voltage-boosting converter 21 as control of the system voltage.

As described above, in this embodiment, the output power of the voltage-boosting converter 21 is controlled so as to reduce the difference ΔPi between the command value Pi* and detected value Pi of the conversion power. It is to be noted, however, that the output power of the voltage-boosting converter 21 may also be controlled so as to reduce the difference ΔPi between the command value Pi* and detected value Pi of the input power of the voltage-boosting converter 21.

In addition, in the embodiment, the total power Pif* of the conversion power is computed as the command value Pif* of the conversion power by carrying out the low pass filtering process on the total power Pi*, which is obtained as a result of adding the input power Pi1 of the first AC motor 13 to the input power Pi2 of the second AC motor 14. Thus, the total power Pif* obtained as a result of the low pass filtering process carried out to eliminate noise components (or high-frequency components) of the total power Pi* can be used as the command value Pif* of the conversion power. As a result, the command value Pif* of the conversion power can be set with a high degree of precision.

Further, in this embodiment, the detected value Pi of the conversion power is computed by using the detected value, which is obtained as a result of a low pass filtering process and used as the detected value icf of the output current of the voltage-boosting converter 21. Thus, the detected value Pi of the conversion power is computed by using the detected value icf obtained as a result of the low pass filtering process carried out to eliminate noise components (or high-frequency components) of the detected value ic of the output current of the voltage-boosting converter 21. As a result, the precision of the computation of the detected value Pi of the conversion power is improved.

As described above, in this embodiment, the input power of the second MG unit 30 (or the second AC motor 14) is controlled so as to suppress variations in system voltage. It is to be noted, however, that the input power of the first MG unit 29 (or the first AC motor 13) may also be controlled so as to suppress variations in system voltage. As an alternative (not shown), in an all-wheel driving configuration including a third MG unit mounted on the dependent wheels, for example, the input power of the third MG unit may also be controlled so as to suppress variations in the system voltage.

Furthermore, the embodiment is directed to a hybrid car of a split type of splitting the power of the engine by using a planetary gear configuration. However, the embodiment may be implemented as a hybrid car adopting another method such as a parallel type of a series type. Moreover, the embodiment may be implemented as a vehicle using AC motors and an engine as power sources. The embodiment can also be implemented as a vehicle employing only AC motors as a power source. In addition, the embodiment can also be implemented as a vehicle employing only one MG unit comprising an inverter and an AC motor as well as a vehicle employing three or more MG units.

What is claimed is:

1. A control apparatus for an electric vehicle having an AC motor, comprising:
   a power converter that converts a voltage supplied by a DC power supply into a system voltage appearing on a power supply line;
   a target voltage setting unit that sets a target value of the system voltage;
   a voltage detector that detects the system voltage;
   a motor driving unit that includes an inverter connected to the power supply line and the AC motor driven by the inverter;
   a motor controller that controls the AC motor by changing electrical conduction of the AC motor;
   a power operation quantity calculator that computes a power operation quantity of an input power of the motor driving unit on the basis of a value set by the target voltage setting unit as the target value and a value detected by the voltage detector as the system voltage; and
   a system voltage controller that, using the computed power operation quantity, executes control of suppressing variations in the system voltage through adjustment of the input power of the motor driving unit by controlling at least one of a duty ratio and a phase of a rectangular waveform representing an electrical conduction state of the AC motor.

2. A control apparatus for an electric vehicle having an AC motor, comprising:
   a power converter that converts a voltage supplied by a DC power supply into a system voltage appearing on a power supply line;
   a motor driving unit that includes an inverter connected to the power supply line and the AC motor driven by the inverter;
   a motor controller that controls the AC motor by a rectangular waveform control method of changing electrical conduction of the AC motor every predetermined value of an electrical angle of the AC motor; and
   a system voltage controller that executes control of suppressing variations in the system voltage through adjustment of an input power of the motor driving unit by controlling at least one of a duty ratio and a phase of a rectangular waveform representing an electrical conduction state of the AC motor in accordance with the rectangular waveform control method,
   wherein the motor controller, in controlling the AC motor by the rectangular waveform control method:
   computes the phase of the rectangular waveform on the basis of a command torque and an estimated torque computed on the basis of a current flowing to the AC motor and a rotational position of a rotor of the AC motor;
   computes a rectangular waveform signal on the basis of the phase of the rectangular waveform, the rotational position of the rotor in the AC motor and a rotation speed of the AC motor; and
   outputs the rectangular waveform signal to the inverter so as to have the command torque generated by the AC motor.

3. The control apparatus according to claim 1, wherein:
   the system voltage controller includes a rectangular waveform operation quantity calculator that computes at least one of operation quantities of the duty ratio and the phase of the rectangular waveform on the basis of a quantity computed by the power operation quantity calculator as the power operation quantity of the input power, and
   the system voltage controller controls the system voltage through adjustment of the input power of the motor driving unit by varying the at least one of duty ratio and the phase of the rectangular waveform in accordance with quantities computed by the rectangular waveform operation quantity calculator as operation quantities of the rectangular waveform.

4. The control apparatus according to claim 3, wherein:
   the rectangular waveform operation quantity calculator computes an operation quantity of the phase of the rectangular waveform on the basis of the duty ratio of the rectangular waveform and the command torque.

5. The control apparatus according to claim 3, wherein:
   the rectangular waveform operation quantity calculator includes a quantity limiting unit that prevents each of operation quantities of the duty ratio and the phase of the rectangular waveform from exceeding a predetermined limit.

6. The control apparatus according to claim 3, further comprising:
   a first low frequency component passing filter for passing only components included in the system voltage detected by the voltage detector as components each having a frequency not higher than a predetermined value, wherein the power operation quantity calculator computes a power operation quantity of the input power of the motor driving unit on the basis of the components passed by the first low frequency component passing filter as components, which are included in the system voltage as components each having a frequency not higher than the predetermined value.

7. The control apparatus according to claim 1, further comprising:

a conversion power command value calculator that computes a command value of either of an input power and an output power as a conversion power of the power converter;

a conversion power detector that detects a value of the conversion power; and a conversion power controller that controls at least one of the input power or the output power of the power converter on the basis of a value computed by the conversion power command value calculator as the command value of the conversion power and a value detected by the conversion power detector as the detected value of the conversion power.

8. The control apparatus according to claim 7, wherein:

the conversion power command value calculator computes the command value of the conversion power on the basis of a power including at least a total value of input powers of all motor driving units connected to the power supply line.

9. The control apparatus according to claim 8, further comprising:

a second low frequency component passing filter for passing only power components included in the power including at least the total value of input powers of all the motor driving units connected to the power supply line as components each having a frequency not higher than a predetermined value, wherein the conversion power command value calculator computes the command value of the conversion power on the basis of the power components passed by the second low frequency component passing filter as power components each having the frequency not higher than the predetermined value.

10. The control apparatus according to claim 7, further comprising:

a current detector for detecting an output current of the power converter, wherein the conversion power detector computes a detected value of the conversion power on the basis of a value set by the target voltage setting unit as the target value of the system voltage or the system voltage detected by the voltage detector and the current detected by the current detector as the output current of the power converter.

11. The control apparatus according to claim 10, further comprising:

a third low frequency component passing filter for passing only components included in the output current of the power converter as components each having a frequency not higher than a predetermined value, wherein the conversion power detector computes a detected value of the conversion power on the basis of the components passed by the third low frequency component passing filter as output-current components each having the frequency not higher than predetermined value.

12. A control apparatus for an electric vehicle having an AC motor and a DC power supply, the control apparatus comprising:

a power converter, connected to the DC power supply, for converting a voltage supplied by the DC power supply into a system voltage;

an inverter, connected to the power converter and the AC motor, for driving the AC motor driven by the inverter by the system voltage supplied by the power converter;

a voltage sensor, connected to the power converter, for detecting the system voltage supplied by the power converter; and a motor control unit, connected to the power converter and the inverter, for controlling the power converter and the inverter, so that control for the power converter and control for the inverter do not interfere each other;

the motor control unit being configured to compute a voltage difference between a target system voltage and an actual system voltage detected by the voltage sensor, compute a power operation quantity of an input power of the AC motor in correspondence to a computed voltage difference, and change electrical conduction of the AC motor through the inverter in accordance with a computed power operation quantity, so that the voltage difference is reduced;

the motor control unit being configured to compute a conversion power difference between a target conversion power of the power converter and an actual conversion power produced by the power converter, and control the power converter in accordance with a computed conversion power difference, so that the computed conversion power difference is reduced; and the motor control unit being configured to compute the actual conversion power in correspondence to at least the target system voltage.

13. The control apparatus according to claim 12, further comprising:

a current sensor connected to detect a current flowing between the power converter and the inverter, wherein the motor control unit is configured to compute the actual conversion power based on both of the target system voltage and an actual current detected by the current sensor.

* * * * *